United States Patent [19]

Lazenby

[11] Patent Number: 5,058,594

[45] Date of Patent: Oct. 22, 1991

[54] DIRECT VELOCITY ESTIMATOR FOR ULTRASOUND BLOOD FLOW IMAGING

[75] Inventor: John C. Lazenby, Unincorporated Area, Wash.

[73] Assignee: Quantum Medical Systems, Incorporated, Issaquah, Wash.

[21] Appl. No.: 574,669

[22] Filed: Aug. 29, 1990

[51] Int. Cl.$^5$ ............................................... A61B 8/00
[52] U.S. Cl. ............................ 128/661.08; 128/661.09
[58] Field of Search ...................... 128/661.08, 661.09; 73/861.25

[56] References Cited

U.S. PATENT DOCUMENTS

| | | | |
|---|---|---|---|
| 4,328,707 | 5/1982 | Clement et al. | 73/618 |
| 4,612,937 | 9/1986 | Miller | 73/861.25 |
| 4,719,923 | 1/1988 | Hartwell et al. | 128/661.08 |
| 4,751,929 | 6/1988 | Hayakawa et al. | 73/861.25 |
| 4,790,323 | 12/1988 | Leavitt et al. | 128/661.09 |
| 4,800,891 | 1/1989 | Kim | 128/661.09 |
| 4,809,703 | 3/1989 | Ishikawa et al. | 128/661.08 |
| 4,819,652 | 4/1989 | Micco | 128/661.09 |
| 4,888,694 | 12/1989 | Chesarek | 128/660.01 |
| 4,905,206 | 2/1990 | Nishiyama et al. | 128/661.09 |

Primary Examiner—Francis Jaworski
Assistant Examiner—George Manuel
Attorney, Agent, or Firm—Lawrence C. Edelman

[57] ABSTRACT

A method and apparatus for estimating blood flow velocities with an ultrasound imaging system. The method includes radiating a plurality of ultrasound beams having a fixed phase relationship with a reference frequency; receiving a plurality of successive echoes from the successive beams from the same volume of blood; and estimating the blood flow velocity from the phase shift changes, relative to the reference frequency, between a plurality of successive echo pairs by multiplying each phase shift change by coefficients stored in a RAM and accumulating the results. Desirably, the phase shift changes between the multiple pairs of successive echoes are weight averaged during the multiplication and accumulation process to arrive at the velocity estimate. A method of improving the blood flow velocity estimate at a given volume by obtaining velocity estimates at a plurality of contiguous volumes and multiplying each velocity estimate by coefficients stored in a RAM and accumulating the products to arrive at a substitute velocity estimate at the given volume.

3 Claims, 7 Drawing Sheets

DIRECT VELOCITY ESTIMATOR FOR ULTRASOUND BLOOD FLOW IMAGING

DESCRIPTION

1. This invention generally relates to ultrasound imaging systems. More particularly, it relates to a method and apparatus for directly estimating blood flow velocity using ultrasound.

2. Background of the Invention

Modern ultrasound imaging systems can create and detect echoes from moving sound scatterers, such as blood in a patient's circulatory system. These abilities have enabled prior art ultrasound imaging systems to estimate a patient's blood flow velocity.

While prior art systems can provide velocity estimates useful to the medical community, they are plagued by poor resolution and erroneous readings. This is at least partially due to their velocity estimation methods. For example, prior art blood flow velocity estimators are usually based on either a spectral analysis using discrete Fourier transforms or on an autocorrelation analysis of the echoes. Both methods are relatively insensitive to velocity changes, but are readily affected by poor input signal-to-noise ratios and input signal distortion.

The above-identified problems could be alleviated by using multiple measurements when determining the velocity estimates. However, the operating methods of prior art systems are typically slow and therefore the added time needed to collect the additional echoes and to perform the additional signal analysis would result in an unacceptably slow system.

Therefore, it is clear that there has existed a need for a quick and accurate system for providing blood flow velocity estimates.

SUMMARY OF THE INVENTION

It is an object of this invention to provide a method and apparatus for quickly and accurately estimating blood flow velocities with an ultrasound imaging system.

This and other objects of this invention, which will become apparent as the invention is more fully described below, are provided by a method and apparatus which provides blood flow velocity estimates. The method comprises radiating, a plurality of times, an ultrasound beam having a phase relationship with a reference frequency; receiving a plurality of successive echoes from successive beams from the safe volume of blood; and estimating the blood flow velocity from the phase shift changes, relative to the reference frequency, of successive echoes by multiplying phase shift changes between multiple pairs of echoes by coefficients stored in a RAM and accumulating the results. Desirably, the phase shift changes between the multiple pairs of successive echoes are weight averaged during the multiplication and accumulation process to arrive at the velocity estimate.

To improve the blood flow velocity estimate at a given volume, velocity estimates at a plurality of contiguous volumes are determined, the velocity estimates are multiplied by coefficients stored in a RAM, the products are accumulated, and the sum is substituted for the velocity estimate at the given volume.

BEST MODE FOR CARRYING OUT THE INVENTION

Figure 1:
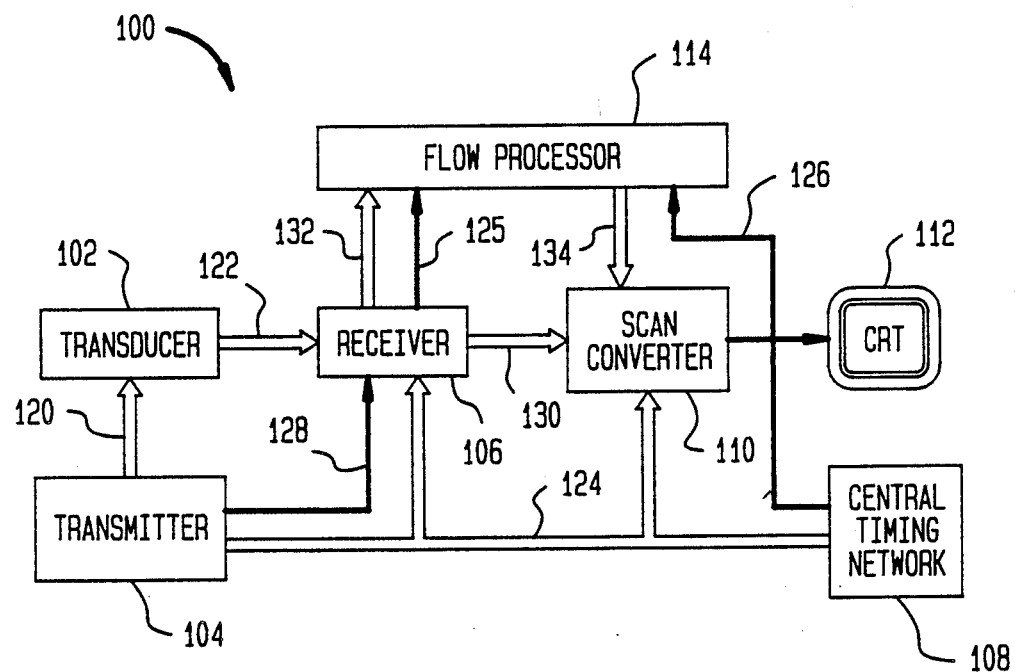
FIG. 1 is a block flow diagram of an ultrasound imaging system capable of determining blood flow velocities according to the inventive method.

A block diagram of an ultrasound system 100 incorporating the present invention is shown in FIG. 1. It includes a transducer 102, a transmitter 104, a receiver 106, a central timing network 108, a scan converter 110, and a CRT 112, all having functional counterparts in prior art systems. However, the preferred ultrasound system also includes a flow processor 114 which directly determines velocity estimates as explained subsequently.

The transducer 102 generates a sequence of pulsed ultrasound beams that probe a region of a patient's anatomy. The beams, short bursts of ultrasound energy occurring at a uniform frequency, are generated in a pattern over the region of interest. These beams are capable of creating reflections from subcutaneous sound scatterers, including moving sound scatterers in the blood. The transducer 102 comes in either of two types, with the preferred type depending on the particular application.

Figure 2A:
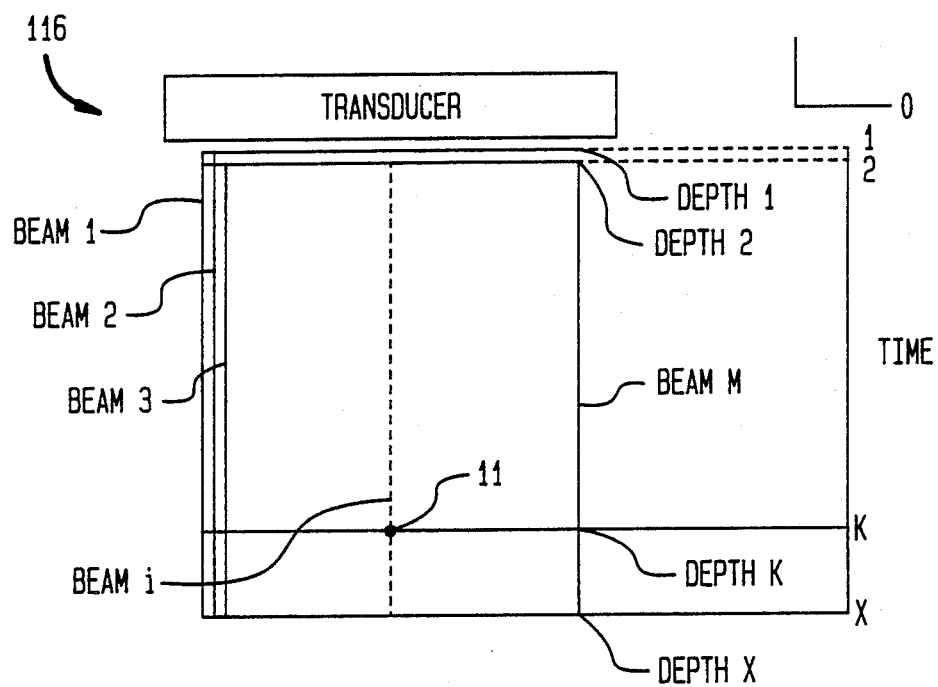
FIG. 2A illustrates the scanning pattern from a raster scanning transducer usable in the system of FIG. 1.

The first type of transducer 102 is a raster scanning transducer 116, illustrated in FIG. 2A. The raster scanning transducer 116 radiates ultrasound energy in substantially parallel beams from a number of individual transducer elements (not shown), each of which radiates ultrasonic energy upon excitation by an electrical signal. The individual transducer elements also generate electrical signals when ultrasonic energy impinges on them. As shown in FIG. 2A, the raster scanning ultrasound transducer 116 generates a leftmost beam 1, an adjacent beam 2, and so on until the rightmost beam M is generated. In practice these beams overlap slightly so that all sound scatterers within the range of the raster scanning transducer 116 are radiated by at least one beam. The region scanned by each beam is, as shown, a thin volume.

Figure 2B:
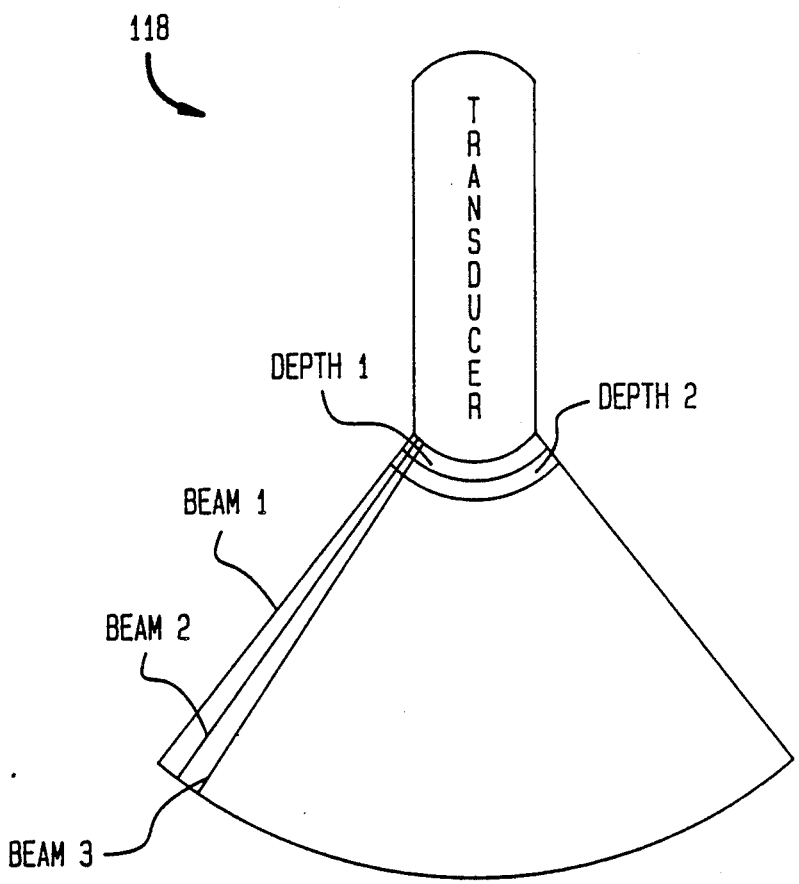
FIG. 2B illustrates the scanning pattern from a sector scanning transducer usable in the system of FIG. 1.

The other type of transducer 102 is a sector scanning transducer 118, illustrated in FIG. 2B. The sector scanning transducer 118 also generates multiple beams, with each beam again formed by one or more individual transducer elements. However, unlike the parallel beams from the raster scanning transducer 116, a sector scanning transducer 118 produces beams that essentially radiate from a single point at varying angles. Since the region scanned by each beam is again a thin volume, the region scanned by the sector scanning transducer 118 is a partial sphere.

Referring again to FIG. 1, the individual transducer elements of the transducer 102 are coupled via a bus 120 to the transmitter 104, and via a bus 122 to the receiver 106. The central timing network 108 sends a data word via a bus 124 to the transmitter 104 and a reference signal via a lines 126 to the flow processor 114. The transmitter 104 uses the data word to determine which beam is to be radiated from the transducer 102. The transmitter 104 then causes that beam to be generated, a number of times, N, at fixed intervals, by applying fixed frequency electrical signals, via bus 120, to selected individual transducer elements of the transducer 102. When the data word changes, the transmitter 104 causes a different beam to be generated, again N number of times at fixed intervals, by applying the fixed frequency electrical signals to another selection of individual transducer elements.

The number of times, N, that a beam is generated for each data word is important, as will become apparent when weight averaging and smoothing is discussed. At this time, however, it is important to note that each beam is generated multiple times. In the preferred system N ranges between 4 and 16, depending on the operating conditions.

The generated beams travel through a patient until they impinge on various sound scatterers, such as tumors or organs, or moving features such as blood cavitations and microscopic blood components. Portions of the beam's energy, called returns, reflect from the sound scatterers and go back to the transducer 102. The individual transducer elements of the transducer 102 convert these returns into return signals, hereinafter referred to as echoes. The above operations of the transducer 102, the transmitter 104, and the central timing network 108 can be implemented using well known circuit designs.

The echoes from the transducer 102 are applied via the bus 122 to the receiver 106. The receiver 106 is also connected via the bus 124 to the central timing network 108. The data words on the bus 124 inform the receiver 106 that echoes are expected and directs the receiver 106 to accept echoes only from selected individual transducer elements. When the data word changes, so do the selected individual transducer elements. Thus, the receiver 106 is adjusted to receive echoes similar to the way that the transmitter 102 is adjusted to create particular beams.

As is shown in FIG. 1, the receiver 106 amplifies the echoes and applies them (1) internally to a digitizer for conversion into their digital representation and (2) ) externally, via line 125, to the flow processor 114. To better implement the present invention, the echoes are associated with both their source beams and the depth of the sound scatterers that they return from. This association is conveniently accomplished by attaching digital number "tags" to the digitized echoes that represent each echo's source beam and the depth of its sound scatterer. The digital number representing the source beam is conveniently just the digital word on the bus 124.

The number representing the sound scatterer's depth is derived from time sampling circuitry in the receiver 106. In time sampling, a transmit pulse from the transmitter 104 is applied to the receiver 106, via a line 128, when the transmitter 104 causes a beam to be generated.

This transmit pulse causes the tie sampling circuitry to begin sampling the digitized echoes at discrete time intervals, which correspond to depths within the patient. This is illustrated in FIG. 2A which shows the shallowest sampled depth, depth 1, corresponding to a time 1, the next sampled depth, depth 2, corresponding to a time 2, and so on. Therefore, time sampling associates each digitized echo with a depth, and a number representing time (and depth) is easily attached to the digitized echo by using a counter. It should be noted that the depth number actually represents a range of depths, with the range dependent on the time interval during which the echoes are sampled.

With the source beam and depth numbers attached to a digitized echo, that echo is uniquely identified with a particular volume. For example, referring again to FIG. 2A, if the depth number is "K" and the source beam number is "i," it is known that the echo is from a volume at location 11. This echo identification process assists in the comparison of echoes from one location with those from other locations. The above operation of the receiver 106 can be implemented using well known circuit designs.

Referring now to FIG. 1, the digitized echoes are output from the receiver 106, along with their associated source beam and depth numbers, via a bus 130 to the scan converter 110. The associated source beam and depth numbers are sent to the flow processor 114 via bus 132.

The scan converter 110 produces an image representation from the digitized echoes on bus 130 that is displayed on a cathode-ray tube, CRT 112. Each echo's position on the CRT 112 is controlled by the associated source beam and depth numbers and its luminance is dependent on the digitized echo. Consequently, the images on the CRT 112 are synchronized with the volume locations where the echoes return from. In the present invention, the scan converter 110 also receives velocity estimates from the flow processor 114, via a bus 134, which are used to add velocity estimate information to the display of CRT 112. This requires that the velocity estimate information from the flow processor 114 must be synchronized with the volume locations they are from. As is subsequently explained this is accomplished using the associated source beam and depth numbers applied to the flow processor 114 on bus 132. In the preferred embodiment, CRT 112 shows stationary sound scatterers in a gray scale and moving sound scatterers in color, with different colors denoting different velocities.

THE THEORY OF THE PRESENT INVENTION

The theory underlying the present invention is that successive echoes from moving sound scatterers substantially differ, while successive echoes from stationary sound scatterers are near duplicates. An obvious difference between successive echoes from moving sound scatterers is that they occur at different times relative to the generation of their source beams. This time difference effects a phase shift change between successive echoes, with respect to their transmitted frequency. The size of the phase shift change is proportional to sound scatterer velocity. Therefore, by measuring the phase shift change between successive echoes, the existence of a moving sound scatter can be detected, and its velocity can be estimated.

The change in phase shift $d\psi$ (in radians) is:

$$d\psi = 2\pi(dt)/T$$

where dt is the additional echo travel time caused by sound scatterer movement, and T is the period of the transmitted ultrasound frequency.

The additional echo travel time, dt, is:

$$dt = 2(PRI)v/c$$

where v is the sound scatterer velocity away from the transducer; PRI is the pulse repetition interval, the fixed time between successive pulses; and c is the speed of sound.

Thus, the phase shift change and the sound scatterer velocity are related by $$d\psi = 4\pi(PRI)v/(cT)$$

or $$v = cT(d\psi)/(4\pi(PRI)).$$

This indicates how velocity estimates can be determined from the phase changes between two successive echoes.

While velocity estimation theoretically requires only two echoes, the quality of the overall estimate can be improved by averaging phase shift changes over successive pairs of echoes. This averaging process itself can be improved by giving more relative importance to phase shifts changes of larger echoes since, in the presence of noise, large echoes will provide better velocity estimates than will small echoes. This process of averaging phase shift changes as a function of echo magnitude is called "weight averaging."

To perform velocity estimation the phase shift changes of the successive echoes, or their equivalents, must be available. It is convenient to visualize echoes as having an Euler form:

$$Echo = Me^{j\psi}$$

where M is a magnitude, and $\psi$ is the phase of the echo. Then, the velocity can be estimated from the phase changes between successive echoes, $d\psi$, and the magnitude M is available for weight averaging.

While the Euler representation is easily visualized, the inventive method represents each echo from a given volume as a vector component having real and complex parts, with the real part being the portion of an echo being in-phase with a reference frequency, and the imaginary part being the portion of the echo 90° out-of-phase with the reference frequency. Then the velocity estimates are determined using matrix operations. In a vector representation, all N echoes from a given location form a vector s, with the jth echo denoted as vector component $s_j$. The weighted velocity estimate from the N echoes is given by:

$$\text{Velocity estimate} = \sum_{j=1}^{N-1} (s_j^*)(s_{j+1})$$

where $s_j^*$ is the complex conjugate of $s_j$. This is the same as:

$$\text{Velocity estimate} = \sum_{j=1}^{N} s_j^* \sum_{k=1}^{N} (P_{jk})(s_k)$$

where P is an N x N matrix whose entries, $P_{jk}$, are all zero unless $k = j+1$, in which case the entry is 1. That the two previous expressions are equivalent can be shown by summing first over k; the stated entries $P_{jk}$ ensure that:

$$\sum_{k=1}^{N} (P_{jk})(s_K) = s_j^*1$$

Therefore, the weighted velocity estimates are determined using matrix multiplication and summation. Note that weight averaging of the velocity estimates is inherent in the above process since strong echoes have more effect on the outcome then do weak echoes. This is advantagous in the presence of noise.

The advantage of determining velocity estimates using matrix operations are realized when values for entries $P_{jk}$ are not restricted to ones and zeroes. As an example, using only four pulses for simplicity, assume that a matrix $P_1$ has entries:

|       | j = 1 | j = 2 | j = 3 | j = 4 |
|-------|-------|-------|-------|-------|
| k = 1 | 0     | 2     | −1    | −1    |
| k = 2 | 0     | −1    | 2     | −1    |
| k = 3 | 0     | −1    | −1    | 2     |
| k = 4 | 0     | 0     | 0     | 0     |

Now, also assume that the phase shift of successive echoes are 90°. Then the input echoes representations, $s_j$, using a unity scale factor are as follows:

$s_1 = 1$
$s_2 = j$
$s_3 = -1$
$s_4 = -j$

Matrix multiplying, and adding all terms results in an estimate of 8j, which is the correct phase shift.

However, if the sound scatterer is stationary, the echoes, $s_j$, have a constant value as follows:

$S_1 - 1$
$S_2 = 1$
$DS_3 = 1$
$S_4 = 1$

After matrix multiplying $P_1$ and these new $s_j$'s all terms, zero is obtained. Thus, stationary and slow moving sound scatterers would produce no velocity estimate output. The matrix $P_1$, is therefore useful when the velocity to be estimated is for rapidly moving blood.

The above examples illustrate only some of what can be achieved by employing matrix operators of the type:

$$\text{Velocity estimate} = \sum_{j=1}^{N} s_j^* \sum_{k=1}^{N} P_{jk} s_k$$

Other types of matrix signal processing are possible by using other entries for the matrix P. For example, in the preferred embodiment apparatus, the effects of input signal processing prior to the velocity estimator necessitate apparatus specific entries for matrix P.

Another way the inventive method improves the velocity estimate is by "smoothing." Smoothing provides improved velocity estimates by taking advantage of the fact that echoes from neighboring volumes are often highly correlated, while noise in neighboring volumes is uncorrelated. Smoothing highly correlated velocity estimates has little effect on the velocity estimates but tends to reduce noise effects. Smoothing essentially trades off spatial resolution to improve the effective signal-to-noise ratio.

Figure 3:
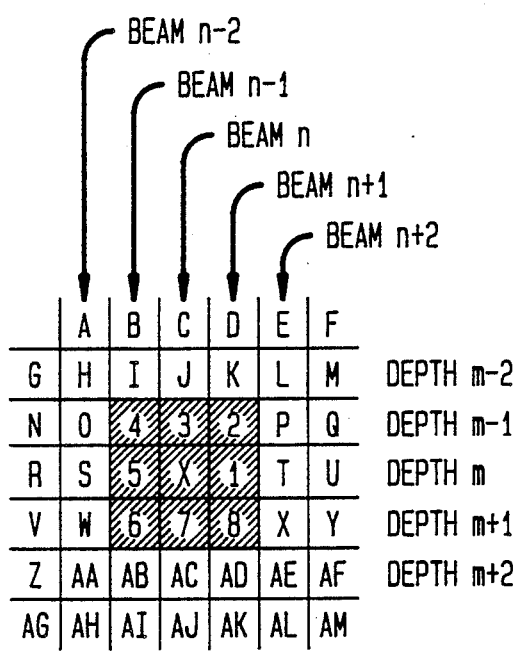
FIG. 3 is an illustration, used in the explanation of the smoothing process, showing the spatial relationship between a plurality of velocity estimates.

The process of smoothing is better explained by reference to FIG. 3. Prior to smoothing, velocity estimates at a plurality of volume locations, say locations X and 1 through 8 in FIG. 3, are determined. Then, a weighted average of the velocity estimates is taken and a new, smoothed velocity estimate is substituted for the original velocity estimate at volume X. Mathematically, this process is:

$$V_{1X} = A_1 V_1 + A_2 V_2 \ldots + A_8 V_8 + A_X V_x$$

where $V_{1x}$ is the new, smoothed velocity estimate at volume X; $A_n$ is the weight coefficient representing the relative importance of the velocity estimate at volume N; and $V_N$ is the velocity estimate at volume N.

While smoothing has been described using a 3×3 region, other schemes are specifically conterplated for use with the present invention. The best scheme to use depends on the spatial correlation of the velocity estimates at various locations. Smoothing is particularly useful in determining the velocity of arterial blood flow, since those flow velocities are highly correlated in space.

THE FLOW PROCESSOR

Figure 4:
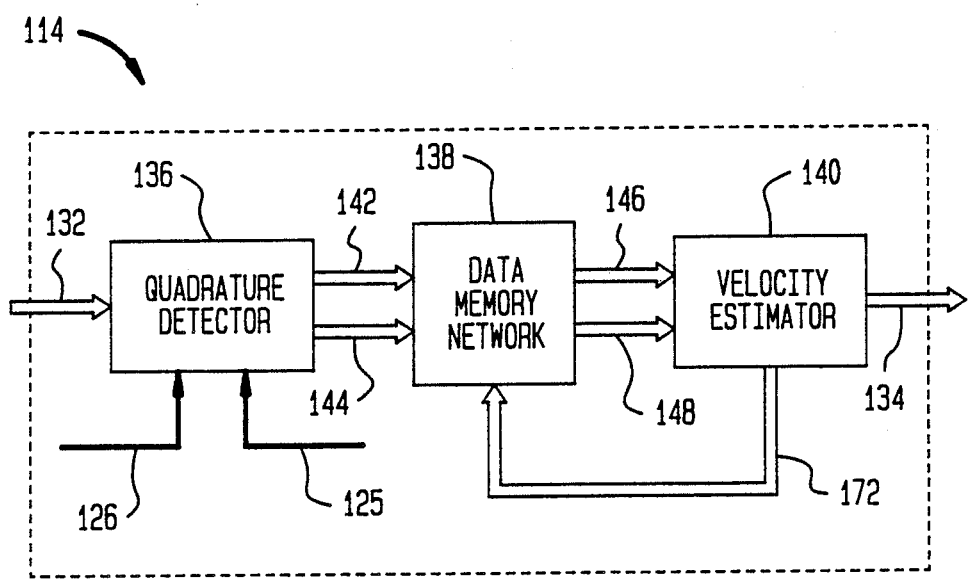
FIG. 4 is a block diagram of the flow processor used in the system of FIG. 1.

The flow processor 114, shown in FIGS. 1 and 4, actually implements velocity estimation. Referring to FIG. 4, the flow processor 114 itself is comprised of a quadrature detector 136, a data memory network 130, and a velocity estimator 140.

The quadrature detector 136 receives the amplified analog echoes from the receiver 106 on line 125, the associated source beam and depth numbers on the bus 132, and a reference signal on line 126. The quadrature detector 136 converts the analog echoes into their in-phase and quadrature components, referenced to the reference signal on line 126 from the central timing network 108 (shown in FIG. 1). The quadrature detected in-phase magnitudes are equal to the portions of the echoes that are in-phase with the reference signal on line 126, while the quadrature magnitudes are equal to the portions of the echoes that are 90° out-of-phase with the reference signal. The reference signal on line 126 has a stable phase relationship to the electrical signals from the transmitter 104 going to the transducer 102. Thus, the generated beams have a stable phase relationship to the reference signal.

The analog in-phase and quadrature components are then digitized to form digital quadrature detected in-phase and quadrature signals. Since the flow processor 114 output is blended in the scan converter 110 with corresponding receiver 116 outputs on bus 130, synchronization of the two outputs is required. This is accomplished by using the associated source beam and depth numbers on the bus 132 to synchronize digitization of the analog in-phase and quadrature signals. Also, the associated source beam and depth numbers are tagged to the digitized in-phase and quadrature signals for later use.

Referring to FIG. 4, the quadrature detector 136 outputs the in-phase and quadrature signals along with their associated source beam and depth numbers, on buses 142 and 144, respectively, to the data memory network 138. The data memory network 138 stores each in-phase and quadrature signals and associated source beam and depth numbers, in temporal order. After all echoes have been received for all beams, the data memory network 138 then sorts both the in-phase and quadrature signals so that all signals from each depth are grouped together in order of beam numbers, and so that the groups are sorted in order of increasing depth. This sorting is accomplished using the associated source beam and depth numbers attached to each in-phase and quadrature signal. As indicated, the associated source beam and depth numbers are important for operation of the scan converter 110. Therefore, while the associated source beam and depth numbers will no longer be specifically discussed, it is to be understood that they follow the signal flow to the scan converter 110.

After sorting, the data memory network 138 sequentially applies the now sorted in-phase and quadrature elements simultaneously to the velocity estimator 140 via buses 146 and 148, respectively. The sequential application of the sorted in-phase and quadrature elements to the buses 146 and 148 is under the direction of timing signals on bus 172 from the velocity estimator 140. The timing signals on bus 172 provide synchronization as required between operation of the data memory network 138 and the velocity estimator 140.

Figure 5:
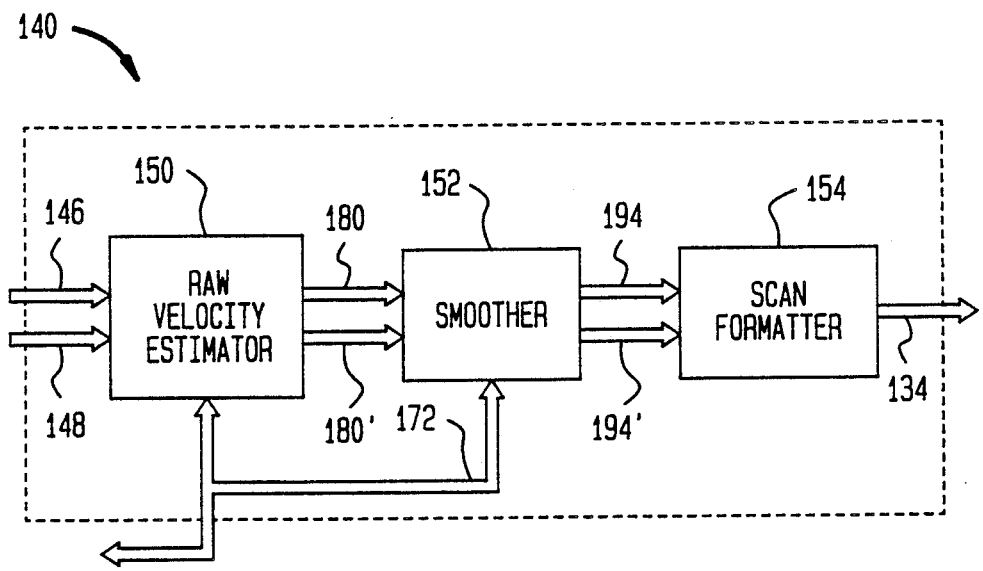
FIG. 5 is a block diagram of the velocity estimator section of the flow processor of FIG. 4.

As is shown in FIG. 5, the velocity estimator 140 is comprised of three primary sections, a raw velocity estimator 150, a smoother 152 and a scan formatter 154. Briefly, the raw velocity estimator 150 calculates the velocity estimates using matrix multiplication and product accumulation; the smoother 152 smooths the estimates as required; and the scan formatter 154 formats the final velocity estimate to a form suitable for the scan converter 110.

Figure 6:
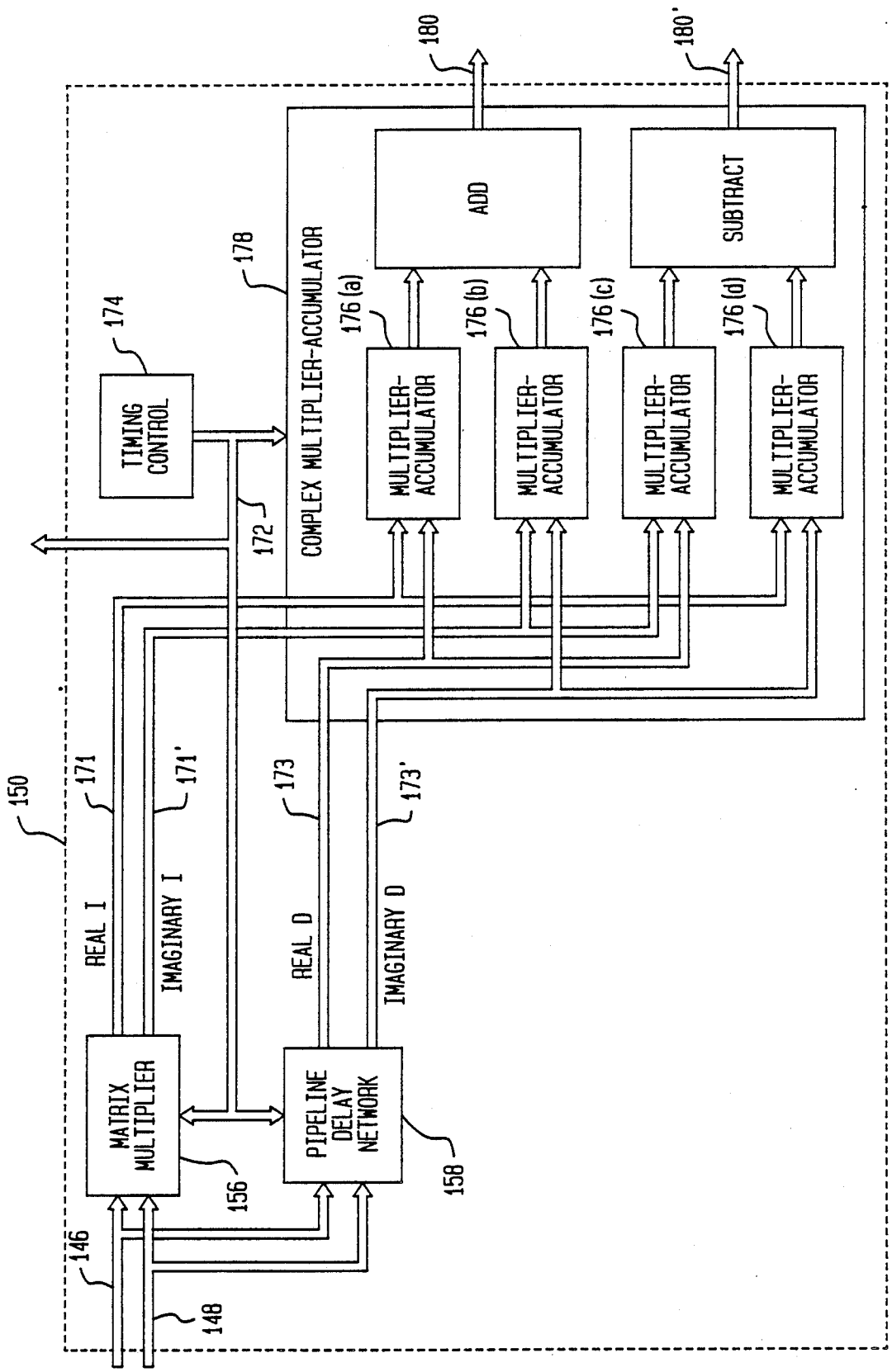
FIG. 6 is a block diagram of the raw velocity estimator section of the velocity estimator of FIG. 5.

The raw velocity estimator 150 itself is shown in a block diagram format in FIG. 6. It receives the sorted in-phase and quadrature elements from the data memory 138 on the buses 146 and 148, respectfully. These elements are applied simultaneously to a matrix multiplier 156 and a pipeline delay network 158.

Figure 7:
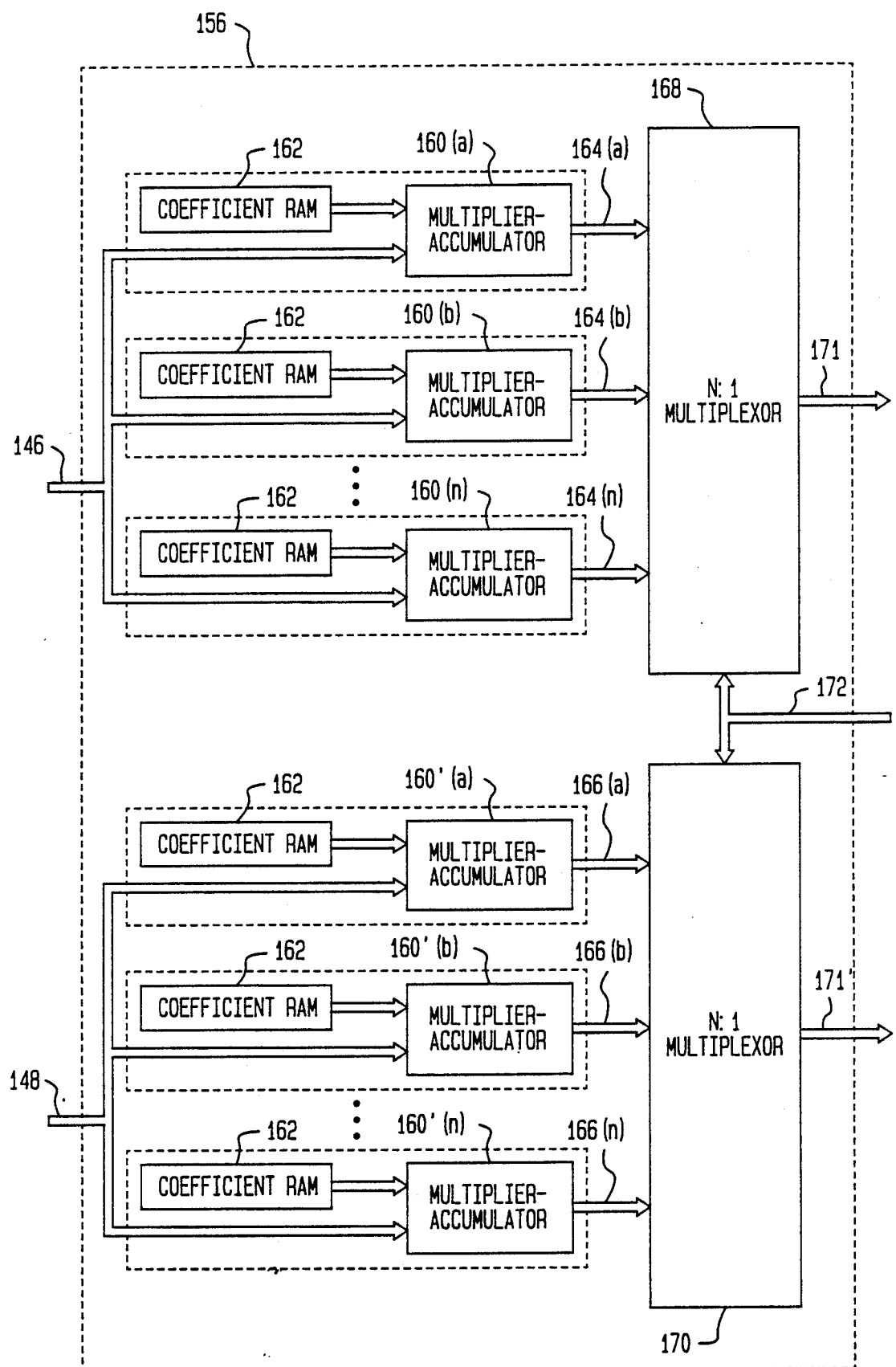
FIG. 7 is a block diagram of the matrix multiplier section of the raw velocity estimator section of FIG. 6.

The matrix multiplier 156 is shown in a block diagram format in FIG. 7. There are N in-phase and N quadrature signals for each volume location scanned by the transducer 102, one each for the N generated beams for each data word on bus 124. Each in-phase signal is handled as a real number, each quadrature signal is handled as an imaginary number, and together they are handled as a complex vector element of an N-dimensioned depth vector, D, having each of the N echoes from the same volume location as an entry. Each in-phase signal is applied to each of the multiplier-accumulators 160(a)–160(n), and each quadrature signal is applied to each of the multiplier-accumulators 160'(a)–160'(n). Connected to the 2N multiplier-accumulators, 160(a)–160(n) and 160'(a)–160'(n), is a coefficient RAM 1 62, which contains predetermined values corresponding to entries of a matrix P. As previously explained, the matrix P can effectuate various signal processing functions during velocity estimation. Therefore, the coefficients in RAM 162 are selected according to the signal processing to be implemented.

The 2N multiplier-accumulators multiply the coefficient values in RAM 162, entries for the matrix P, by the vector elements of the depth vector D. The multiplier-accumulators 160(a)–160(n) and 160'(a)–160'(n) then sum the products of each multiplication, forming an accumulated total for each vector element. These accumulated totals are available on lines 164(a)–164(n) and on lines 166(a)–166(n) for the real and imaginary products, respectively.

The accumulated totals are selected by multiplexors 168 and 170 as directed by timing signals from the timing control 174 via bus 172, refer to FIGS. 6 and 7. The timing control 174 also controls the synchronization between the operation of the data memory network 138 and the velocity estimator 140 as previously described. Referring to FIG. 7, the output of multiplexor 168 is applied to bus 171, and the output of multiplexor 170 is applied to bus 171'.

The above process effectively forms an N-dimensioned interim vector I, comprised of complex valued vector elements determined by:

$$\text{Vector } I \text{ element} = \sum_{k=1}^{N} (P_{jk})(D_k).$$

Referring now to FIG. 6, the outputs of the matrix multiplier 156 on buses 171 and 171' are applied, along with the outputs of the pipeline delay network 158, on buses 173 and 173', to four multiplier-accumulators 176(a)-176(d) in the complex multiplier-accumulator 178. The pipeline delay network 158 consists of a pair of pipeline registers whose length is set so as to delay the digitized echoes on buses 146 and 148 the same amount they experience going through the matrix multiplier 156. The timing control 174 controls the operating sequence by applying timing signals on bus 172. The signals applied to the multiplier-accumulators 176(a)-176(d) are handled as elements of (1) the interim vector I and (2) a time delayed version of the depth vector D.

The complex multiplier-accumulator 178 provides the raw velocity estimates by calculating the complex product of the interim vector I and the complex conjugate of the time delayed version of the depth vector D. This is done by adding the products of the real parts and the products of the imaginary parts of vectors I and time delayed D to form the real part of the raw velocity estimate. The imaginary part of the raw velocity estimate is formed by (1) adding the products of the real part of the time delayed vector D and the imaginary part of the vector I and (2) subtracting the products of the imaginary part of time delayed vector D and the real part of vector I. The complex multiplier-accumulator 178 outputs the raw velocity estimates on data buses 180 (real elements) and 180' (imaginary elements) to the smoother 152, as is shown in FIG. 5. The raw velocity estimate is a complex signal having a magnitude that is nearly the square of the power contained in the echoes of the vector D and a phase that is an equivalent of the velocity estimate at the volume location of vector D.

Until now, the operation of the velocity estimator 140 has been described only with reference to a single volume location so as to avoid undue confusion. However, the preferred embodiment ultrasound imaging systems actually performs velocity estimates at many volume locations. Thus, since the operation of the smoother 152 requires a plurality of raw velocity estimates at known locations, it is to be understood that the raw velocity estimator 150 sequentially outputs velocity estimates at many volume locations under the control of the timing signals on bus 172.

Figure 8:
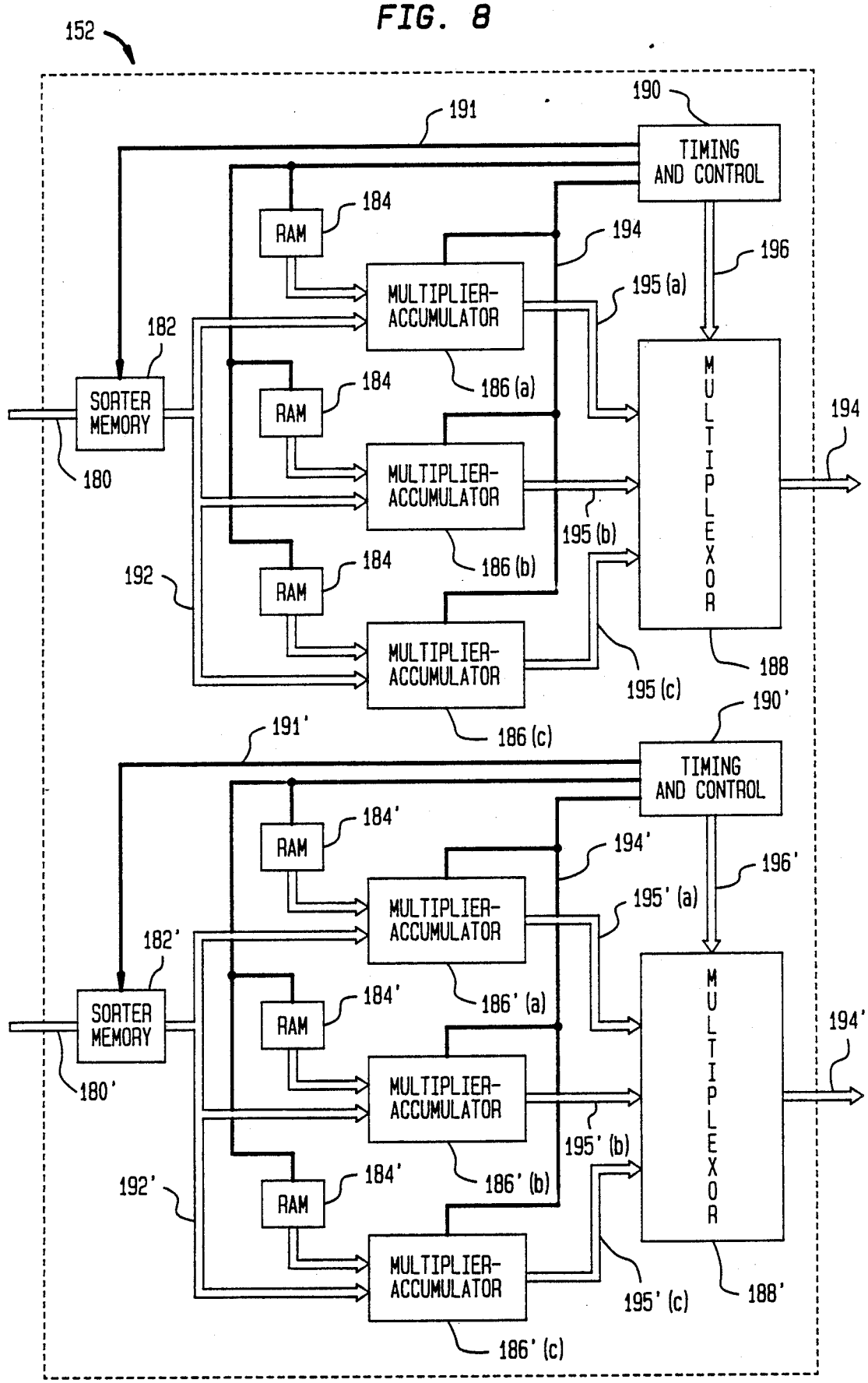
FIG. 8 is a block diagram of the smoother section of the velocity estimator of FIG. 5.

Referring to FIG. 5, the smoother 152 smooths the raw velocity estimates from the raw velocity estimator 150. Now referring to FIG. 8, the smoother 152 receives the complex velocity estimate from the raw velocity estimator 150, the real part, on bus 180, goes to one section and the imaginary part, on bus, 180' goes to an identical section. The section with real inputs is comprised of a sorter memory 182, a RAM 184, three multiplier accumulators 186(a) through 186(c), a multiplexor 188 and a timing and control circuit 190. The section with the imaginary inputs uses the above numbering scheme except with primes. As the operation of each section is the same, only the section with real inputs will be specifically discussed.

The sorter memory 182 sequentially stores each of the real elements of the several complex velocity estimates until all complex velocity estimates to be used in smoothing are available. Then, the sorter memory 182 reorders the stored real elements and applies them, with proper timing as directed by the timing and control circuit 190 via line 191, sequentially in groups according to depth and increasing beam numbers on bus 192 to the multiplier accumulators 186(a)-186(c). For example, referring to FIG. 3 and using groups of three (3), the velocity estimates for locations B, C, and D are applied to each multiplier accumulators 186(a)-186(c), and then velocity estimate for locations I, J, and K, and then 4, 3, 2, and so on.

Still using groups of three for explanatory purposes, the first triple of velocity estimates on bus 192, say from locations B, C, and D will cause the multiplier accumulator 186(a) to multiply each of the velocity estimates for locations B, C, and D by a coefficient from the RAM 184 and accumulate the result. The next triple, velocity estimates at locations I, J, and K will cause both multiplier accumulators 186(a) and 186(b) to multiply each of the velocity estimates for locations I, J, and K by coefficients from the RAM 184 and to accumulate the result. The next triple, for 4, 3, and 2 will cause all multiplier accumulators 186(a)-186(c) to multiply each of the velocity estimates for locations 4, 3, 2 by coefficients from the RAM 184 and to accumulate the result.

At this time, the value, VJ, accumulated in multiplier accumulator 186(a) and available on bus 195(a) is:

$$VJ = (A1)B + (A2)C + (A3)D + (A4)I + (A5)J + (A6)K + (A7)4 + (A8)3 + (A9)2$$

where the values within the parentheses are the coefficients from the RAM 184 applied to the multiplier accumulator 186(a) during accumulation of VJ, the smoothed velocity estimate for location J. The output on bus 195(a), VJ, is selected by the multiplexor 188 and is applied on bus 194. The multiplier accumulator 186(a)-186(c) output bus which is selected is controlled by signals on bus 196 from the timing and control 190.

The next triple will cause all multiplier accumulators 186(a)-186(c) to multiply each of the velocity estimates for locations 5, X, and 1 by coefficients from the RAM 184 and to accumulate the result. The accumulated value, V3, in multiplier accumulator 186(b) and available on bus 195(b) is:

$$V3 = (B1)I + (B2)J + (B3)K + (B4)4 + (B5)3 + (B6)2 + (B7)5 + (B8)X + (B9)1$$

where the values within the parentheses are the coefficients from the RAM 184 applied to the multiplier accumulator 186(b) during accumulation of V3, the smoothed velocity estimate for location 3. The output on the bus 195(b), V3, is then selected by multiplexor 188 and is applied to bus 194.

The next triple will cause all multiplier accumulators 186(a)-186(c) to multiply each of the velocity estimates for locations 6, 7, and 8 by coefficients from the RAM 184 and to accumulate the result. The accumulated value VX in multiplier accumulator 186(c) and applied to bus 195(c) is:

$$VX = (C1)4 + (C2)3 + (C3)2 + (C4)5 + (C5)X + (C6)1 + (C7)6 + (C8)7 + (C9)8$$

where the values within the parentheses are the coefficients from the RAM 184 applied to the multiplier accumulator 186(c) during accumulation of VX, the smoothed velocity estimate for location X. The output on the bus 195(c), VX, is then selected as the output from multiplexor 188 and is applied to bus 194.

The next triple will cause all multiplier accumulators 186(a)–186(c) to multiply each of the velocity estimates for locations AB, AC, and AD by coefficients from the RAM 184 and to accumulate the result. The timing and control 190 causes the accumulated value on bus 195(a) to be output on bus 194. This process is repeated continuously and each time a new triple is applied to the multiplier accumulators 186(a)–186(c) the next output is applied on bus 194. Because of the impossibility of producing the correct triple of data for the left, right, top and bottom edges of the image, no smoothed velocity estimates are output for them.

Smoothing has been described using a 3×3 volume location matrix and coefficients stored within RAM 184. Smoothing can also be performed using other groupings of volume estimates. For example, referring to FIG. 3, the velocity estimate for volume location X can be smoothed using the 7×5 volume location matrix:

| G | H | I | J | K | L | M |
|---|---|---|---|---|---|---|
| N | O | 4 | 3 | 2 | P | Q |
| R | S | 5 | X | 1 | T | U |
| V | W | 6 | 7 | 8 | X | Y |
| Z | AA | AB | AC | AD | AE | AF | and values from RAM 184. The values stored in RAM 184 are selected to produce the desired smoothing. In the preferred apparatus the smoothing scheme and coefficients for RAM 184 are selected according to the application. For example, in relatively wide, horizontal arteries, where velocities are highly correlated but noise is a problem, the 7×5 volume location smoothing scheme and identical coefficients in RAM 184 are suitable. If the artery is thin, blood flow velocities are not as correlated and the 3×3 volume location scheme is preferable, with the coefficient of RAM 184 selected to give more weight to the velocity estimates from the same depth as the location being smoothed.

The outputs of the smoother 152, on buses 194 and 194', are applied to the scan formatter 154 for conversion to a form useable by the scan convertor 112. The smoothed complex velocity estimate from the smoother 152 has a real part and an imaginary part. These parts contain both magnitude and phase information. The velocity estimate itself is contained in the phase information. The scan formatter 154 extracts the phase information from the smoothed complex velocity estimate and applies it in proper form to the scan formatter 154.

In the above discussion, the in-phase and quadrature elements of all components have been described as literally following parallel paths. While this may be done in practice, in the preferred embodiment time multiplexing of the in-phase and quadrature elements to share a single bus is actually performed. This results in a savings of hardware. The practice of time multiplexing is well known and was not specifically discussed previously to avoid confusion.

The inventive method of determining blood flow velocities is significantly faster than the methods used in prior art systems. Therefore, while the present invention preferably uses multiple echoes from each volume location to determine the velocity estimate at that volume location, it requires fewer echoes than prior art systems to produce a high quality estimate, resulting in significantly faster operation. While a software implementation of the inventive method is possible, the preferred hardware implementation increases operating speed.

From the foregoing, it will be appreciated that the invention, as described herein for purposes of illustration, provides an advancement in ultrasound imaging blood flow velocity estimation. Although the best mode for practicing the invention has been described herein, various modifications may be made without departing from the spirit and scope of the invention. Accordingly, the scope of the invention extends to the broad general meaning of the appended claims.

I claim:

1. A method of estimating blood flow velocity using echoes, comprising the steps of:
   radiating a plurality of successive beams having known phase relationships with a reference frequency;
   receiving said beams as successive echo beam from a blood volume; and
   evaluating the phase shift changes, relative to said reference frequency, between said successive echo beams to determine an estimate of the blood flow velocity, including the steps of:
   commuting an N element interim vector, I having complex entries $I_j$ determined by, $$I_j = \sum_{k=1}^{N} (P_{jk})(s_k)$$

where $P_{jk}$ represents a complex entry of an N×N matrix jP, and $s_k$ represents a complex entry of an N dimensioned vector s with each $s_k$ being an echo having an magnitude and phase relative to said reference frequency; and
   determining the estimate of the blood flow velocity by applying the equation;

$$BFVE = \sum_{k=1}^{N} (s_k^*)(I_j)$$

where BFVE is the blood flow velocity estimate, $s_k^*$ is the complex conjugate of $s_k$, and $I_j$ is the jth entry of the interim vector I.

2. The method of claim 1 wherein the step of computing an N dimensioned interim vector I is performed by the steps of;
   multiplying each entry $s_k$ by each entry $P_{jk}$ to form a sequence of products $s_k P_{jk}$; and
   accumulating the sequence of products to form $I_k$.

3. The method of claim 1, wherein the step of evaluating the phase shift changes further includes the step of forming the matrix P having entries $P_{jk}$ such that:

$$\sum_{k=1}^{N} (P_{jk})(s_k) = s_j + 1$$

* * * * *